(12) United States Patent
Peterson et al.

(10) Patent No.: US 12,358,607 B2
(45) Date of Patent: Jul. 15, 2025

(54) METHOD OF MANUFACTURING COMPOSITE AIRCRAFT STRUCTURES

(71) Applicant: Airspace Experience Technologies Inc., Detroit, MI (US)

(72) Inventors: Gregory Eric Peterson, Sylvan Lake, MI (US); Jon Rimanelli, Detroit, MI (US)

(73) Assignee: Airspace Experience Technologies, Inc. (ASX), Detroit, MI (US)

( * ) Notice: Subject to any disclaimer, the term of this patent is extended or adjusted under 35 U.S.C. 154(b) by 0 days.

(21) Appl. No.: 18/421,289

(22) Filed: Jan. 24, 2024

(65) Prior Publication Data

US 2024/0158068 A1     May 16, 2024

Related U.S. Application Data

(63) Continuation-in-part of application No. 17/585,735, filed on Jan. 27, 2022.
(Continued)

(51) Int. Cl.
*B64C 3/26*     (2006.01)
*B29C 65/48*     (2006.01)
(Continued)

(52) U.S. Cl.
CPC ............ *B64C 3/26* (2013.01); *B29C 65/48* (2013.01); *B29C 65/56* (2013.01); *B29C 70/52* (2013.01);
(Continued)

(58) Field of Classification Search
CPC .............. B23P 2700/01; B23P 2700/12; Y10T 29/49622; Y10T 29/4997; Y10T 29/4998;
(Continued)

(56) References Cited

U.S. PATENT DOCUMENTS

| | | | | |
|---|---|---|---|---|
| 1,535,526 A | * | 4/1925 | Gilmore | B64C 3/00 |
| | | | | 244/133 |
| 4,356,616 A | * | 11/1982 | Scott | B64C 3/187 |
| | | | | 52/84 |

(Continued)

FOREIGN PATENT DOCUMENTS

| | | | | |
|---|---|---|---|---|
| CA | 2268561 A1 | * 12/1999 | ............ | B62D 21/02 |
| CA | 2842408 A1 | * 10/2014 | ............ | B64C 3/185 |

(Continued)

OTHER PUBLICATIONS

10-2015-0085751 Korean—Pub Date: Jul. 24, 2015—Applicant: Jung—Machine Translation.

*Primary Examiner* — Jermie E Cozart
(74) *Attorney, Agent, or Firm* — Bodman PLC (57) ABSTRACT

A method of making a wing for an aerospace vehicle includes forming a frame member defining opposing perpendicular legs being spaced by an interconnecting member. A plurality of ribs is interconnected along the frame member at spaced locations forming an internal wing structure. Each of the ribs define an upper rib surface and a lower rib surface. A composite upper skin and lower skin are formed as a continuous sheet by way of a pultrusion process defining a shape that is complimentary to the plurality of ribs. The upper skin is secured to the upper surface defined by the plurality of ribs and the lower skin is secured to the lower surface of the plurality of ribs forming the aerospace wing.

18 Claims, 6 Drawing Sheets

Related U.S. Application Data (60) Provisional application No. 63/440,894, filed on Jan. 24, 2023, provisional application No. 63/141,941, filed on Jan. 26, 2021.

(51) Int. Cl.
  *B29C 65/56* (2006.01)
  *B29C 65/60* (2006.01)
  *B29C 70/52* (2006.01)
  *B64C 3/18* (2006.01)
  *B64C 1/00* (2006.01)
  *B64U 10/20* (2023.01)

(52) U.S. Cl.
  CPC .............. *B64C 3/185* (2013.01); *B64C 3/187* (2013.01); *B23P 2700/01* (2013.01); *B23P 2700/12* (2013.01); *B29C 65/60* (2013.01); *B64C 2001/0072* (2013.01); *B64U 10/20* (2023.01); *Y10T 29/49622* (2015.01); *Y10T 29/4997* (2015.01); *Y10T 29/4998* (2015.01)

(58) Field of Classification Search
  CPC   B64C 3/185; B64C 3/187; B64C 3/26; B64C 2001/0072; B29C 65/48; B29C 65/60
  See application file for complete search history.

(56) References Cited

U.S. PATENT DOCUMENTS

| | | | |
|---|---|---|---|
| 6,314,630 B1 * | 11/2001 | Munk | B25B 5/163 |
| | | | 29/469 |
| 6,689,448 B2 * | 2/2004 | George | B29C 70/545 |
| | | | 428/113 |
| 10,099,783 B1 | 10/2018 | Nilson | |
| 10,543,905 B1 | 1/2020 | Kwon et al. | |
| 2013/0020438 A1 * | 1/2013 | Glynn | B32B 37/18 |
| | | | 428/179 |
| 2015/0217852 A1 * | 8/2015 | Sanderson | B64C 1/065 |
| | | | 244/123.7 |
| 2019/0047342 A1 | 2/2019 | Dietrich | |
| 2019/0168877 A1 | 6/2019 | Agajanian | |
| 2021/0300527 A1 | 9/2021 | Thalheimer | |
| 2021/0362867 A1 | 11/2021 | Tian | |
| 2022/0144421 A1 | 5/2022 | Rimanelli et al. | |
| 2022/0281597 A1 | 9/2022 | Tian | |

FOREIGN PATENT DOCUMENTS

| | | | | |
|---|---|---|---|---|
| EP | 2604524 A2 * | 6/2013 | ............ | B25J 9/1682 |
| EP | 2666714 A2 * | 11/2013 | ............ | B64C 1/12 |
| EP | 2730498 A2 * | 5/2014 | ............ | B64C 1/26 |
| KR | 10-2015-0085751 A | 7/2015 | | |

* cited by examiner

METHOD OF MANUFACTURING COMPOSITE AIRCRAFT STRUCTURES

CROSS-REFERENCE TO RELATED APPLICATIONS

The present application claims priority to United States Provisional Patent Application No. 63/440,894 filed on Jan. 24, 2023, the contents of which are incorporated in entirety. The present application also claims priority as a continuation-in-part patent application to U.S. patent application Ser. No. 17/585,735 filed on Jan. 27, 2022 that claims priority to U.S. Provisional Patent Application No. 63/141,941 filed on Jan. 26, 2021, the contents of which are incorporated herein by reference.

BACKGROUND OF THE INVENTION

Traditional techniques for manufacturing aerospace components such as, for example, aircraft wings is known to be exceedingly difficult and expensive. These components require dozens of unique parts including ribs and spars that serve as longitudinal and transverse structural elements, respectively. Each of these unique parts must be precisely located at distinct, non-perpendicular angles when being secured together. For example, current Boeing 787 carbon reinforced composite wings are known to be exceedingly difficult to assemble. These wings include over 30 different ribs and spars that have unique geometries, yet many are nearly identical in size and shape, which complicates assembly and sorting processes. Furthermore, these wings require ply layups to form a skin of these wings require layering of, for example, applying layers of composite tape, Which is time consuming and labor intensive.

Therefore, it would be beneficial to develop low parts count, simplified aerospace wings that eliminate the need for multiple different ribs and spars, can utilize proven GD&T design principles, be manufactured with proven high run rate processes and reduce the manufacturing time associated with forming the skin of the aerospace wing and substantially reduce the wing assembly time thereby reducing labor costs.

SUMMARY OF THE INVENTION

A method of making a wing for an aerospace vehicle includes forming a frame member defining opposing perpendicular legs being spaced by an interconnecting member. A plurality of ribs is interconnected along the frame member at spaced locations forming an internal wing structure. Each of the ribs define an upper wing surface and a lower wing surface. A composite upper skin and lower skin are formed as a single continuous sheet or a series of multiple sheets defining a shape that is complementary to the plurality of ribs. The upper skin is secured to the upper surface defined by the plurality of ribs and the lower skin is secured to the lower surface of the plurality of ribs forming the aerospace wing.

The inventive aerospace wing eliminates the complicated processes associated with conventional wing construction by eliminating the high number of components and replacing these components with a common rib configuration used throughout the wing. Further, replacing composite tape layup processes with molded or pultruded sheets of material significantly simplifies forming the wing skin using common geometry skins for the entire wing. Thus, layering dozens of composite tape pieces on a mandrel is no longer necessary. The unique design of the aerospace wing of the present invention implements only a few unique parts relying on net machining operations to define contact points between the parts. Common wing skins, ribs and a single I-beam formed of same U-shaped or C-shaped components establish an efficient and economical approach to aerospace manufacturing not previously realized.

BRIEF DESCRIPTION OF THE DRAWINGS

Other advantages of the present invention will be readily appreciated as the same becomes better understood by reference to the following detailed description, when considered in connection with the accompanying drawing, wherein.

DETAILED DESCRIPTION OF THE PRESENT INVENTION

Figure 1:
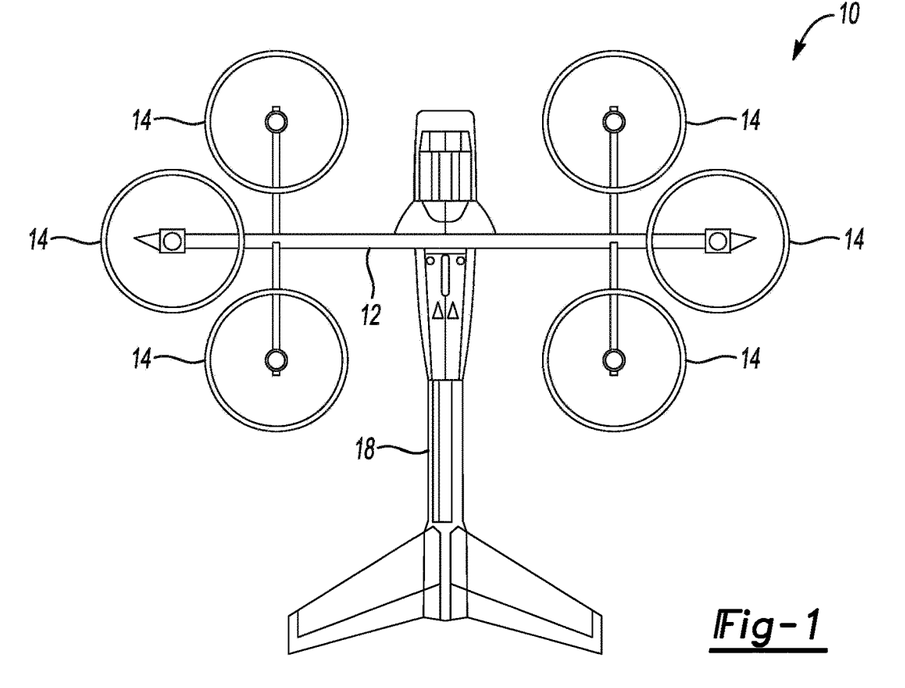
FIG. 1 shows a plan view of an exemplary aircraft implementing the inventive wing of the present application.
Figure 2:
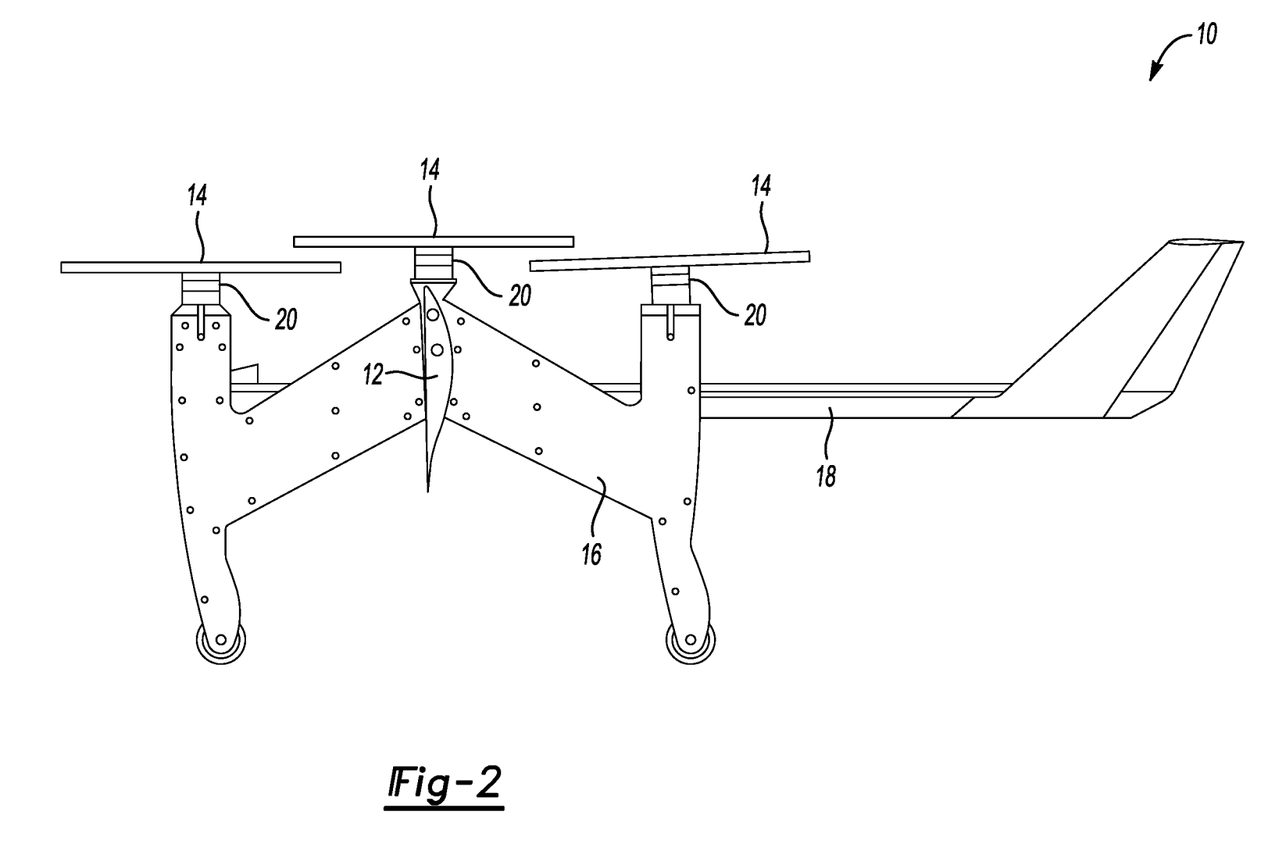
FIG. 2 shows a side view of the aircraft.

Referring to FIGS. 1 and 2, an exemplary aircraft is generally shown at 10. The aircraft is not intended to be limiting but provides environmental perspective of an inventive aerospace wing 12 of the present invention. It should be understood that other aerospace components may adopt the inventive concepts of the present application. However, for simplicity present application refers to the aircraft 10 shown in FIG. 1 and as explained further in co-pending U.S. patent application Ser. No. 17/300,309 SYSTEM AND METHOD FOR THE COOPERATIVE OPERATION OF AERIAL AND TERRESTRIAL VEHICLES and in U.S. Pat. No. 10,752,351 TILT-ROTOR UNMANNED AIR VEHICLE, the contents both of which are incorporated herein by reference.

The aircraft 10 defines a three-dimensional coordinate system having X, Y, and Z axis. The X axis is fore-aft relative to the aircraft 10. The Y axis is transvers or side to side of the aircraft 10. The Z axis is vertical to the aircraft 10. Precise machining the formed components of the wing 12 enables net assembly of the wing 12 within this coordinate system.

The aircraft 10 includes a plurality of propellers 14 each pivotably interconnected to the wing 12 by way of a propeller arm 16 for providing propulsion to the aircraft 10. The wing 12 is pivotally connected to a chassis 18 to provide one of vertical lift to the aircraft when the wing 12 is vertically oriented and to provide horizontal propulsion when the wing 12 is pivoted to a horizontal orientation.

A side view of the propeller arm 16 is shown in FIG. 2. In this of non-limiting embodiment there are three propellers 14 disposed on opposing sides of the chassis 18. Therefore, each arm 16 pivotally supports three propellers 14, two of which are on opposing sides of the wing 12 and a third of which is aligned with the wing 12. The propellers are each driven by an electric motor 20 that is fixedly attached to the propeller arm 16 at an axis defined by the propeller 14.

Figure 3:
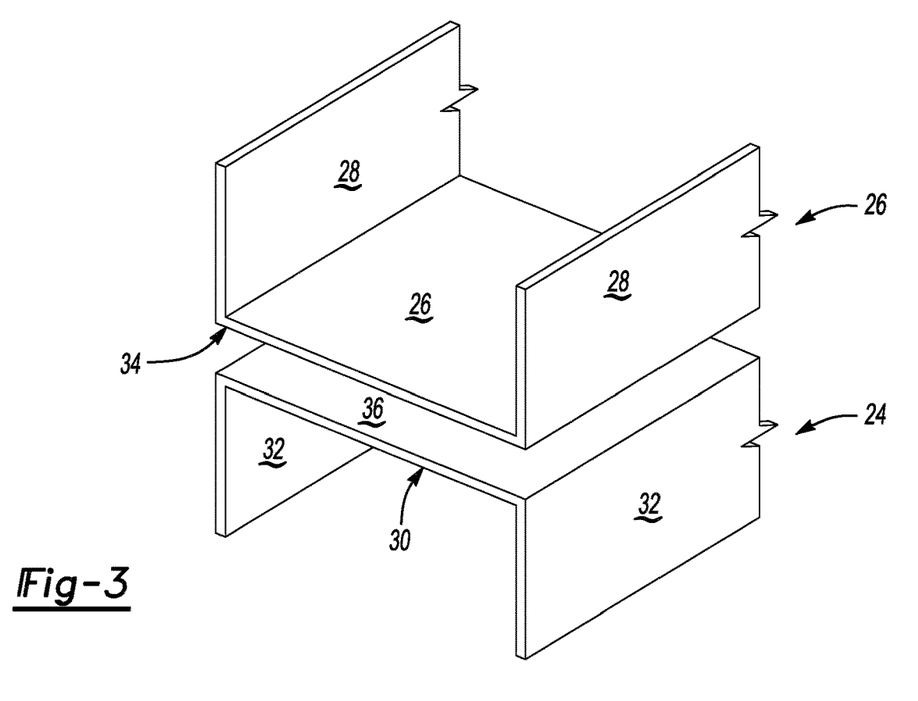
FIG. 3 shows a perspective, exploded view of a frame member.

Referring now to FIG. 3, an upper frame 22 and a lower frame 24 are shown. The upper frame 22 defines an upper frame base 26 and opposing upper frame legs 28 extending from the upper frame base 26 in a same direction to define a C-shaped cross-section. Likewise, the lower frame 24 includes a defines a lower frame base 30 and opposing lower frame legs 32 extending in a same direction to define a C-shaped cross-section.

In one embodiment each of the upper frame 22 and the lower frame 24 are formed by way of a pultrusion process; other production methods such as automated tape placement could also be used. The upper frame 22 and the lower frame are formed of a carbon fiber reinforced plastic (CFRP) such that the carbon fiber strands extending an entire length of the frames 22, 24 to facilitate the pultrusion process and provide structural integrity to the frames 22, 24. Plastic polymers are selected from any polymer that is curable during the pultrusion process and is capable of encapsulating the carbon fiber strands. It should be understood by those of ordinary skill in the art that other fiber materials may be selected in addition to or as an alternative to carbon fiber to achieve desired structural integrity.

The upper frame base 26 defines an upper frame mating surface 34 and the lower frame base 30 defines a lower frame mating surface 36. The mating surface 34, 36 are positioned in an abutting relationship so that the combination of the upper frame 22 and the lower frame 24 form a spar 38 providing an I-beam cross-section. The spar 38 extends a full length of the wing 12 to provide structural support to the wing 12 as will be evident as explained further hereinbelow. The spar 38 could also be molded as a one piece "I" beam.

In one embodiment the mating surfaces 34, 36 are secured together using riv-bonding providing a lengthwise rivet type securement 37. In some embodiments adhesive is placed between the mating surfaces 34, 36 to act in combination with the riv-bonding to enhance the bond between the mating surfaces 34, 36 and further strengthen the spar 38. While riv-bonding is believed suitable to secure the lower frame 24 to the upper frame 26, other methods of affixing the frames 24, 26 together are within the scope of this invention. The spar 38 locates along the Y axis of the aircraft 10.

Once assembly of the spar 38 is complete it is mounted on a rotatable platform similar to an automotive style rotisserie that is supported on wheels enabling movement of the platform for manufacturing efficiency. The rotatable platform defines datums that are relevant to a General Dimension and Tolerance scheme (GD&T) to maximize build ease and repeatability. The datums index to a drill fixture that includes multiple drill bits to machine slots, i.e., receptors 42, 44 in the legs 28, 32 for locating ribs 40 (FIGS. 3 and 4) in the direction of the Y and Z axes at a net tolerance location as will be explained further hereinbelow. Thus, the slots 42, 44 and other machined elements act as assembly datum.

Figure 4:
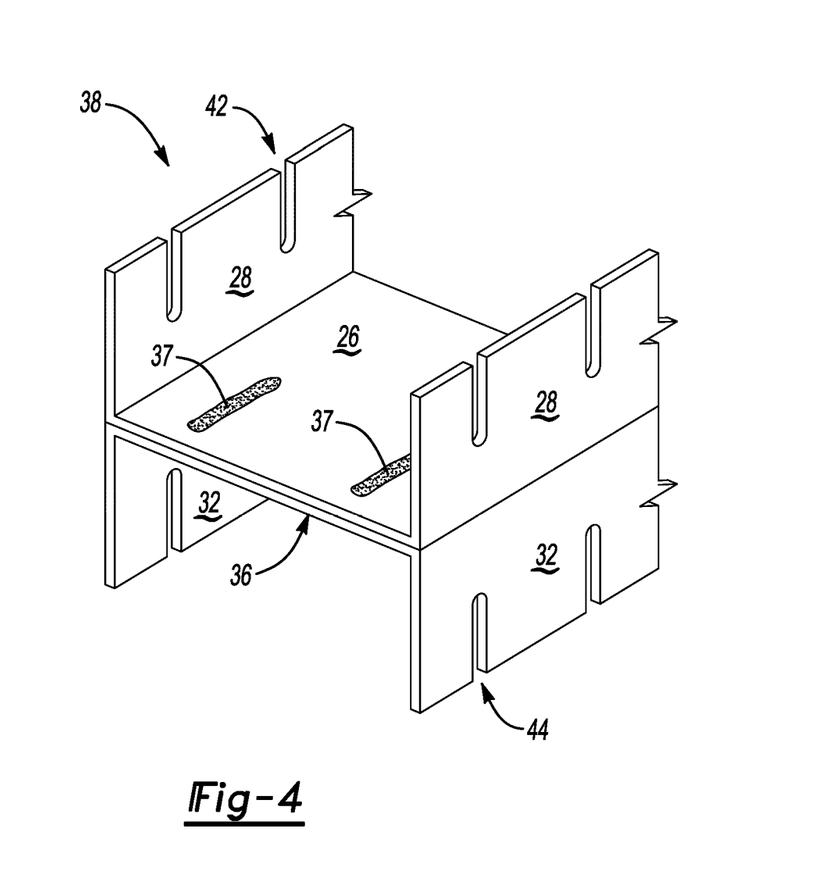
FIG. 4 shows a perspective view of the frame assembly.

It is contemplated by the inventors that one side of an 18 foot spar 38 is machined simultaneously using eighteen drills disposed upon a drill fixture, nine drills for the upper leg 28 and nine drills for the lower leg 32. Therefore, nine upper slots 42 are formed in the upper leg 28 simultaneously with nine lower slots 44 being formed in the lower leg 28. After formation, the platform is rotated 180° so that the opposite side of the spar 38 faces the drills for machining the slots 42, 44 in the opposing legs 28, 32 of the spar 38. It should be understood that more or less slots 42 may be formed depending upon desires size and configuration of the wing 12.

The drill fixture, in one embodiment, is fixed relative to the platform on which the spar 38 is secured. Thus, the fixture is fixed in the transverse direction to the spar 38 to eliminate manufacturing variability in along the Y axis. Spar datums are used locate the spar 10 relative to the platform and to the drill fixture so that the slots are defined in a net location relative to the GD&T scheme. Therefore, manufacturing variability due to the pultrusion process of the upper frame 22 and the lower frame 24 becomes less relevant to locating the ribs 40 within GD&T tolerance. The process renders manufacturing variability generally irrelevant and the ribs 40 may still be provided accurate relative location. This enables an increased tolerance range of the CFRP pultrusion process substantially reducing a need to scrap an assembled spar. Once machining is complete, the spar 38 is moved to an assembly station where it is disposed in a vertical orientation.

Figure 5:
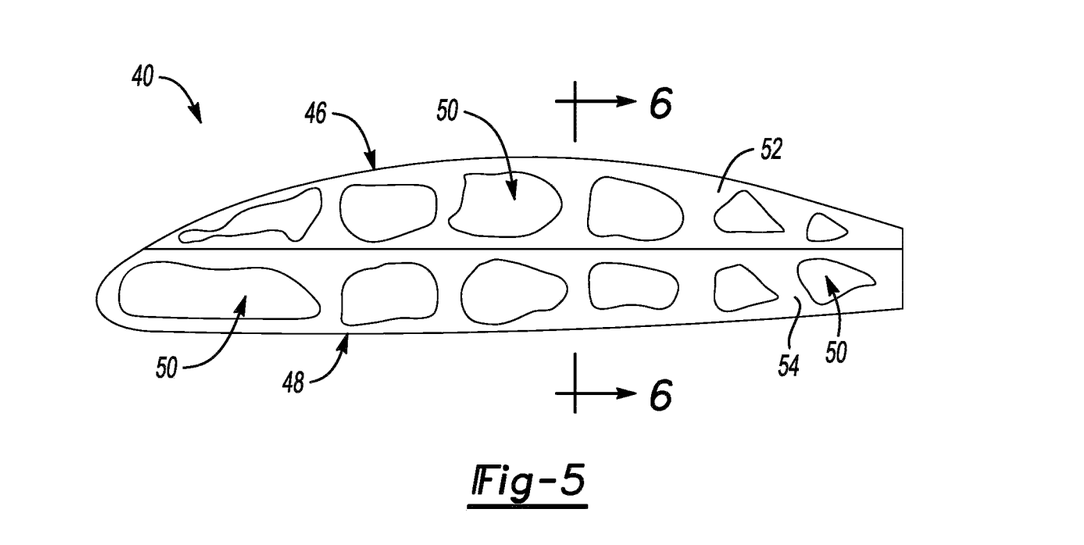
FIG. 5 shows a side view of the upper and lower ribs.
Figure 6:
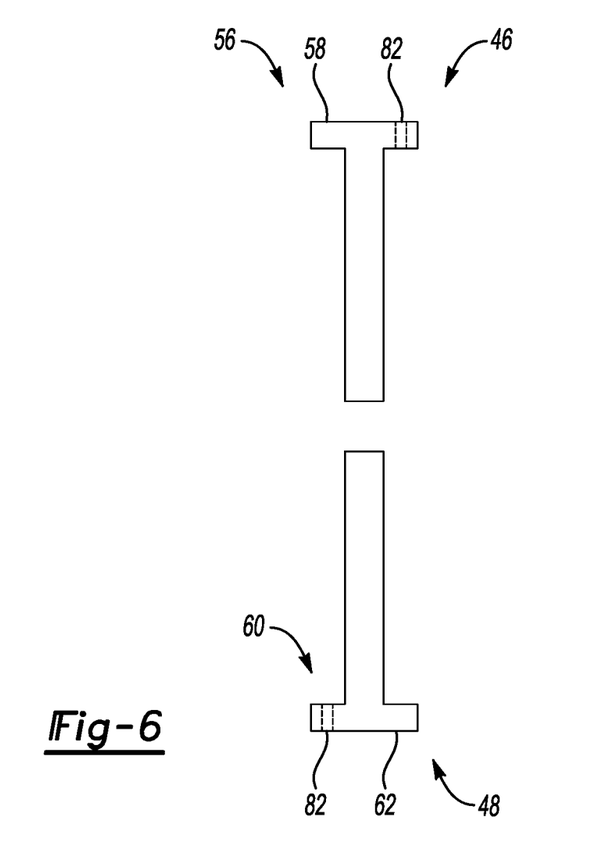
FIG. 6 shows a sectional view of the upper and lower ribs through line 6-6 of FIG. 5.

As best shown in FIG. 5, each rib 40 includes an upper rib portion 46 and a lower rib portion 48. The upper rib portion 46 and the lower rib portion 48 are each formed from injection molded composite that includes fiber reinforced plastic (FRP) to provide structural integrity in a known manner. Both carbon and glass fibers are considerations. To further save weight, an inert gas foamed plastic is a consideration for the injection molding process targeted for the ribs 46. The lower ribs 48 incorporate insert molded nuts 72 at each end. The nuts 72 receive threaded studs or bolts 64 driven through the upper ribs 46 that are torqued after both ribs 46, 48 are bonded to the main "I" beam spar after the net clearance slots 42, 44 have been machined. The upper ribs 46 define round openings 70 with clearance for bolts that drop through the upper ribs at each end and engage with nutserts, i.e. nuts 72 that are molded into the lower ribs 48 at the leading and trailing edges. These fasteners 64, 72 serve to provide mechanical redundancy, in addition to the structural adhesive that bonds the ribs to the "I" beam (spar) 38 and provide tension for the adhesive to set in place correctly as the wing 12 moves down the assembly line. The FRP material provides sufficient strength to the upper rib portion 46 and the lower rib portion 48 enabling each to define weight reduction openings 50 respectively in an upper rib wall 52 and lower rib wall 54. A cross sectional view of the upper rib 46 and the lower rib 48 is shown in FIG. 6 a long line 6-6 of FIG. 5. As can be seen, a distal end 56 of the upper rib 52 defines a mating flange 58. Likewise, the lower rib 48 includes a distal end 60 at which a lower mating flange 62 is defined.

Figure 7:
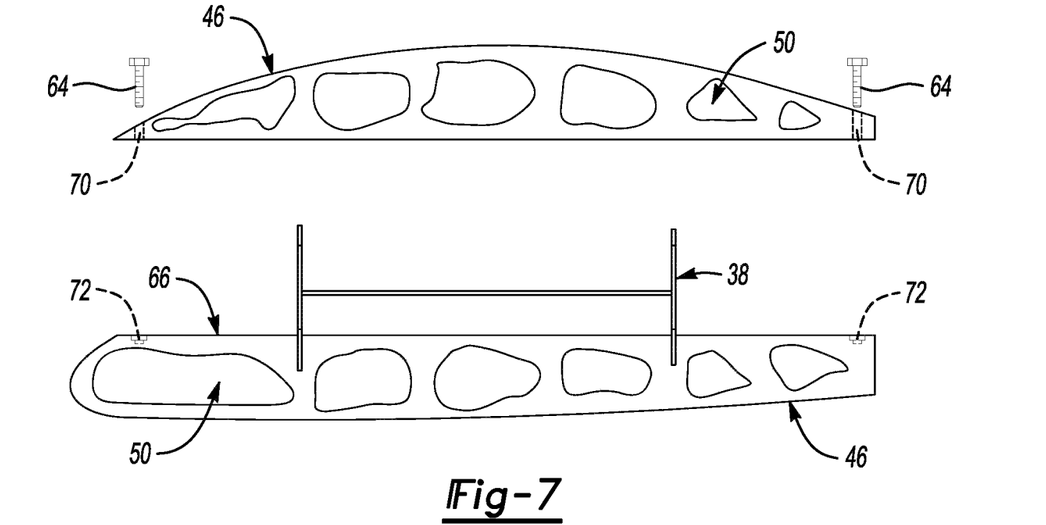
FIG. 7 shows a side exploded view of the frame assembly.

Referring now to FIG. 7, the upper rib 46 is received by the upper slots 42 defined by opposing upper frame legs 28. In like manner, the lower rib 48 is received by lower slots 44 defined by the opposing lower frame legs 32. Once installed, the spar 38, and more particularly the upper frame base 26 and lower frame base 30 are sandwiched between the upper rib 46 and lower rib 48. In one embodiment, the ribs 46, 48 are adhesively bonded to the spar 38 in locations where the ribs 46, 48 abut the spar 38. The studs 64 are received by upper rib aperture 70 when mating the upper rib 46 and lower rib 48 to the spar 38. The upper rib bolts or stud 64 screw into the lower rib nutserts, i.e. nut 72 as shown in FIG. 7 and maintain the ribs 46, 48 in contact with the spar 38 while the adhesive is curing and also serve as a backup securement for the assembly.

Figure 8:
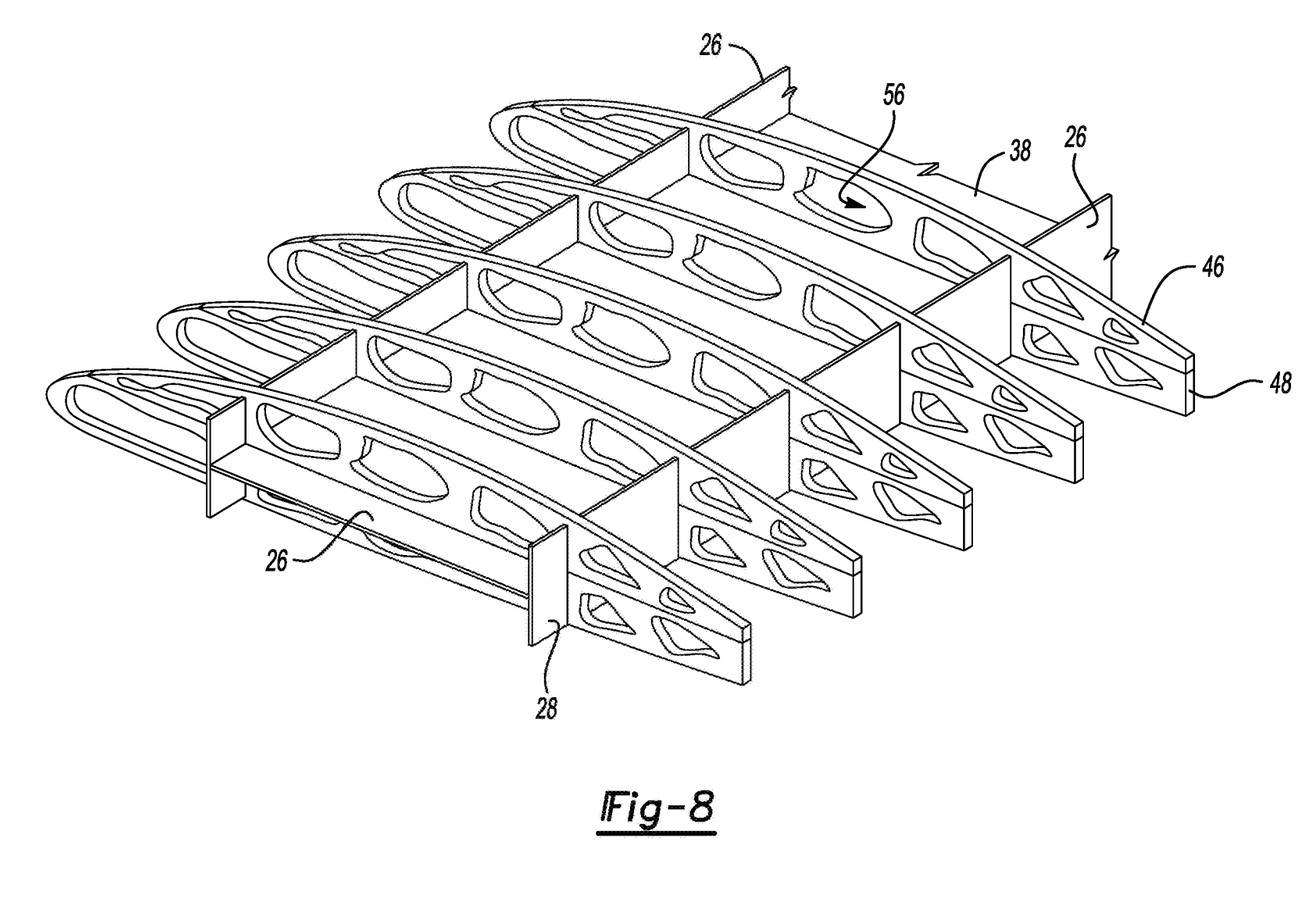
FIG. 8 shows a perspective view of the frame assembly.

When fully assembled, the ribs 46, 48 and spar 38 define a frame assembly 74 as best represented in FIG. 8. Prior to completing the wing 12, the frame assembly 74 has moved to an installation station where internal hardware is installed, routed through openings 50 when necessary. Therefore, ancillary lines such as coolant hoses and electrical wiring as well as any electrical or electronic modules and coolant valves are installed once the frame assembly 74 is completed. Alternatively, the ribs 46, 48 define line pass through openings and instructions or lettering formed in the ribs 46, 48 providing directions to an operator. Even further, openings may be defined with specific sizes defined by the components that are received for installation.

Figure 9:
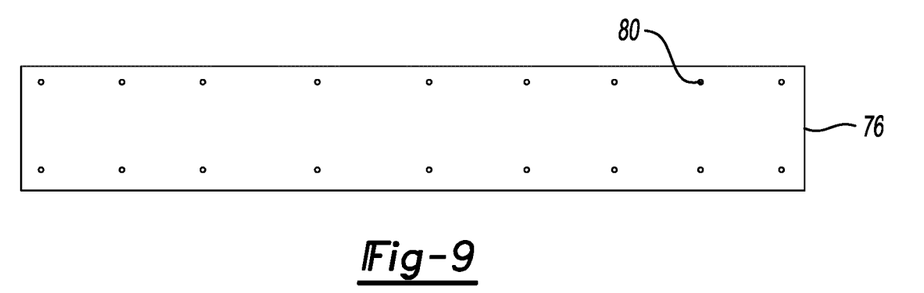
FIG. 9 shows a plan view of the upper skin.
Figure 10:
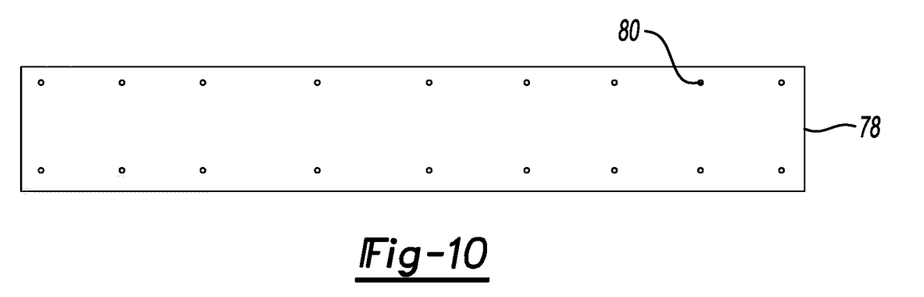
FIG. 10 shows a bottom plan view of the lower skin.

Referring to FIGS. 9 and 10, and upper wing skin 76 and a lower wing skin 78 shown respectively. The wing skins 76, 78 can be formed in a similar manner to the upper frame 28 and the lower frame 32 or using a resin transfer molding (RTM) process or an automated tape layup process. Selected plastics or fiber reinforced plastics may be the same as used to form the spar 38. Alternatively, the plastic and polymers may be selected to provide more durability due to exposure to the environment, and more specifically ultraviolet rays. Fiber reinforcement may be used with both glass, carbon or equivalent fibers candidate materials.

Once the skins 76, 78 are formed, skin apertures 80 are cut at net X, Y coordinate location and holes drilled by the same fixture that drills the wing skin mounting holes in the ribs 46, 48 as per the GD&T scheme so that each of the skins of 76, 78 use net drilled holes 80 with identical mating holes 82 drilled into the upper mating flange 58 for the upper skin 76 and the lower mating holes 80 for the lower skin 78 using the same multi-drill fixture to insure a consistent net build. The skin drilled holes 80 are performed by a net drilling fixing with multiple drill heads, said fixture robotically indexed to datum defined by the GD&T scheme. The Z coordinate of the mating flanges 58, 62 were previously defined by the corresponding slots 42, 44 that were machined into the opposing legs 28, 32 respectively. Thus, the upper skin 76 is mated to upper mating flange 58 and the lower skin 78 is mated to the lower mating flange 62 using the identical hole placement provided by the same drilling fixture such that each wing 12 build is within net design intent, identical and consistent.

Once mated, each aperture 80, 82 receive a rivet to secure each skin 76, 78 to the frame assembly 74. Muli-head riveting fixture used to install and rivet the upper skin 76 to the upper mating flange 58 and the lower skin 78 to the lower mating flange 62. Adhesive may also be used to enhance engagement between the skins 76, 78 and the flanges 58, 62.

Figure 11:
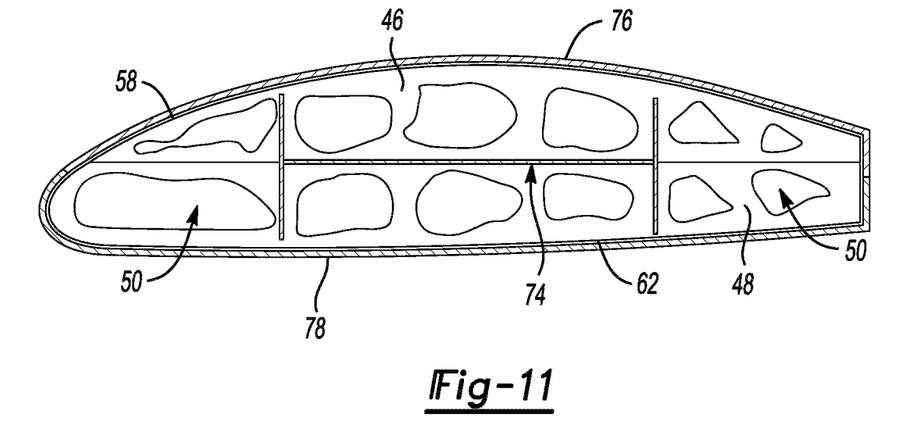
FIG. 11 shows a side sectional view of the wing.

One or more upper skin 76 section may be secured to the spar 38. The chord is identical for the full length of the wing; one tool design is used to make the upper wing skins and one tool design is used to make the lower wing skin. For example, a thirty two foot wing 12 may include four or more skin 76 sections stretching along the Y axis. In a like manner, one or more lower skin 78 sections may be secured to the spar 38. As best represented in FIG. 11, the upper skin 76 and the lower skin 78 cover the entirety of the frame assembly 74 when installed. It should be apparent that both skins 76, 78, each with a unique contour, are contoured to provide the aircraft 10 aerodynamic lift in a known manner.

The invention has been described is in an illustrative manner; many modifications and variations of the present invention are possible in view of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the stated claims following this first disclosed embodiment.

What is claimed:

1. A method of manufacturing a wing for an aerospace vehicle, comprising the steps of:
   forming a frame member by a pultrusion process, said frame member including a perpendicular cross-section defining opposing substantially vertical legs being spaced by an interconnecting member;
   interconnecting a plurality of ribs along said frame member at spaced locations thereby forming an internal wing structure, each of said ribs defining an upper rib surface and a lower rib surface;
   forming a composite upper skin and composite lower skin by one of a pultrusion process, resin transfer molding and ply layup process defining a complementary shape to said plurality of ribs; and
   securing said upper skin to said upper surface of said plurality of ribs and securing said lower skin to said lower surface of said plurality of ribs thereby forming said wing.

2. The method of making a wing assembly set forth in claim 1, wherein said step of forming said frame member is further defined by forming cooperable frame channel portions each comprising a C-shaped cross-section defining an abutting channel bases and opposing channel legs each extending outwardly from said channel base for defining said vertical legs of said frame member thereby forming an I-beam cross-section.

3. The method of making a wing assembly set forth in claim 2, wherein said step of providing cooperable channel portion is defined by forming said channel portions via a pultrusion process.

4. The method of making a wing assembly set forth in claim 2, further including a step of adhering said channel bases of each opposing channel portions with adhesive thereby forming said frame member.

5. The method of making a wing assembly set forth in claim 2, further including a step of riveting said channel bases of each opposing channel portion thereby forming said frame member.

6. The method of making a wing assembly set forth in claim 1, further including a step of forming receptors in opposing distal ends of said legs at spaced locations for receiving said ribs thereby interconnecting said ribs to said elongate member.

7. The method of making a wing assembly set forth in claim 6, wherein said step of forming receptors in opposing distal ends of said legs is further defined by mounting said elongate member onto a fixture and machining said receptors into said distal ends of said legs.

8. The method of making a wing assembly set forth in claim 7, wherein said receptors each define a datum for receiving one of said ribs thereby establishing one of a net or near net assembly.

9. The method of making said wing assembly set forth in claim 6, wherein said step of interconnecting said ribs to said elongate member is further defined by adhering with an adhesive said rib to said frame member.

10. The method of making said wing assembly set forth in claim 1, wherein said step of securing said upper skin to said upper surface of said plurality of ribs and securing said lower skin to said lower surface of said plurality of ribs is further defined by adhering said upper skin to said upper surface of each of said plurality of ribs with an adhesive and adhering said lower skin to said lower surface of said plurality of ribs with said adhesive.

11. The method of making said wing assembly set forth in claim 1, wherein said step of securing said upper skin to said upper surface of said upper ribs and securing said lower skin to said lower surface of said plurality of ribs is further defined by enjoining said skins to said ribs by at least one of an adhesive, a threaded fastener and a rivet.

12. The method of making said wing assembly set forth in claim 1, further including the step of forming said plurality of ribs with injection molded fiber reinforced plastic.

13. The method of making said wing assembly set forth in claim 12, further including the step of molding a fastener into said ribs thereby securing said fastener to said rib.

14. The method of making said wing assembly set forth in claim 13, wherein said step of molding said fastener into said ribs is further defined by molding a nut into one of said upper and said lower rib for receiving a threaded stud through an aperture of said mating rib thereby securing said upper rib to said lower rib.

15. The method of making said wing assembly set forth in claim 1, wherein said step of securing said upper skin to said upper surface of said plurality of ribs and securing said lower skin to said lower surface of said plurality of ribs thereby forming said wing is further defined by drilling mounting holes in flange defined by said ribs with net fixture drill equipment thereby forming mounting holes in said ribs being parallel and perpendicular for receiving fasteners.

16. The method of making said wing assembly set forth in claim 15, further including a step of drilling apertures in said skins being aligned with said mounting holes defined by said flange of said ribs.

17. The method of making said wing assembly set forth in claim 1, wherein said apertures defined by said skins and corresponding of said mounting holes defined by said flange of said ribs receive a rivet for securing said skins to said frame member.

18. The method of making said wing assembly set forth in claim 1, wherein said steps of mating said frame member with said plurality of ribs is further defined by aligning said ribs in parallel.

* * * * *